United States Patent [19]
Amdahl

[11] Patent Number: 6,005,428
[45] Date of Patent: Dec. 21, 1999

[54] SYSTEM AND METHOD FOR MULTIPLE CHIP SELF-ALIGNING CLOCK DISTRIBUTION

[75] Inventor: Gene M. Amdahl, 165 Patricia Dr., Atherton, Calif. 94027

[73] Assignee: Gene M. Amdahl, Atherton, Calif.

[21] Appl. No.: 08/985,344

[22] Filed: Dec. 4, 1997

[51] Int. Cl.$^6$ ........................................................... H03L 7/00
[52] U.S. Cl. ........................... 327/161; 327/163; 327/295
[58] Field of Search ........................... 327/141, 161–163, 327/291, 293, 295, 296, 297, 299

[56] References Cited

U.S. PATENT DOCUMENTS

| | | | |
|---|---|---|---|
| 4,860,322 | 8/1989 | Lloyd | 327/295 |
| 5,122,679 | 6/1992 | Ishii et al. | 327/293 |
| 5,565,816 | 10/1996 | Coteus | 327/295 |

*Primary Examiner*—Kenneth B. Wells
*Attorney, Agent, or Firm*—Steven F. Caserza; Flehr Hohbach Test Albritton & Herbert

[57] ABSTRACT

A multiple chip self-aligning clock distribution system. The clock signal provided to any given chip is delayed by the on-chip distribution time of every other chip with which it is to be synchronized. Equal delay paths are added to each chip which provide a delay equal to the clock distribution delay of the chip. The equal delay paths can comprise a series of logic gates, such as for example inverters. The clock distribution delay of the equal delay path is designed to be equal to the clock distribution delay of the clock distribution tree on the chip. For each chip to be synchronized, the clock signal is routed through an equal delay path on each of the other chips to be synchronized before being coupled to the clock distribution input terminal of the destination chip. The number of equal delay paths that is included on each chip is a function of the number of chips to be synchronized. "N" equal delay paths are used where the number of chips is greater than $2^{N-1}$ and is less than or equal to $2^N$. Process variations that affect the clock distribution delay of the logic on the chip are likely to have a similar effect on the clock distribution delay of the equal delay path. This minimizes the effect of process variations on the clock alignment in the system.

5 Claims, 6 Drawing Sheets

SYSTEM AND METHOD FOR MULTIPLE CHIP SELF-ALIGNING CLOCK DISTRIBUTION

This invention pertains to multiple, greater than two, chip digital systems, and more particularly to a system for self-aligning clock signals, that is simultaneously arriving at the end of the clock distribution tree in each of said chips without any external adjustments required, provided to a plurality of chips in a digital system.

BACKGROUND

In synchronous circuits data is typically latched into memory elements by one or more globally distributed clock signals. The generation of the clock signals and their distribution to the memory elements must adhere to strict requirements to avoid circuit malfunction. In synchronous circuits the clock signal is coupled to all of the registers, flip-flops, and latches as well as to dynamic gates. This large fan-out causes significant delays in the clock signal distribution. It is imperative that the clock signal provided to the logic elements be precisely aligned.

Synchronous inputs to a system obey strict timing relations governed by the system clock. For example, a synchronous input to a flip-flop changes only within a predetermined part of the system clock period. The predetermined timing window for the change in the input is defined to ensure that the setup and hold time requirements of the flip-flop are satisfied. The setup time defines the amount of time that a data input must be available and stable before an active clock edge. The hold time describes the length of time that the data to be clocked into the flip-flop must remain available and stable after an active clock edge.

A delay in the clock signal to a logic gate can violate these timing requirements which can put the circuit into a metastable state which is where the circuit may linger or oscillate indefinitely between two stable states. Failures resulting from metastable behavior are particularly troublesome and mysterious because they are intermittent, random, and virtually untraceable. Larger clock delays can cause the gate to not have switched the current clock cycle value to the output when the output is sampled by a subsequent logic gate.

In multiple chip systems the system clock must be aligned at the point of clock pulse delivery to the logic that is at the end of the clock distribution tree of each of the chips. The clock distribution tree delay for a chip varies due to differences in the chip manufacturing process parameters as well as different clock designs. Process variations between two chips from the same wafer can be significant, process variations between chips from different wafers are typically even larger and chips of different design may be very different. As a result, the clock distribution delay within a system depends on the individual chips that are placed in the system. To take into account the effect of process variations and different chips designs on clock delay, the clock distribution delays in multiple chip systems are calibrated after the chips have been mounted in a system. For example, in systems prior to this invention either a clock control chip or each chip may include a programmable delay. The delay for a chip can be adjusted by providing a delay value to an input which determines how many units of delay are to be included in the clock distribution tree so as to align the clock signal at the end of each clock distribution tree throughout the multiple chip system. This calibration process can be a complicated and time consuming additional step in the manufacturing process which increases the product cost. Furthermore, when a chip is replaced in the system, differences in the clock delay of the replacement chip compared to the replaced chip can destroy the clock alignment, thereby limiting the repairability of the system.

Thus an improved clock distribution system that overcomes these and other problems of the prior art would be highly desirable.

SUMMARY

The present invention provides a multiple chip self-aligning clock distribution system. The clock signal provided to any given chip is delayed by the cumulative on-chip clock distribution tree delay time of every other chip with which it is to be synchronized. Equal delay paths are added to each chip as shown in FIG. 1B as 112 in chip A and 122 in chip B in a two chip system and in FIG. 2B as 222 and 226 in chip A and as 232 and 236 in chip B and as 242 and 246 in chip C and as 252 and 256 in chip D in this four chip system, which provide a delay equal to the clock distribution-tree delay, as shown in FIG. 2B as 224 in chip A and as 234 in chip B and as 244 in chip C and as 254 in chip D in this four chip system, of this chip. The equal delay paths can comprise a series of logic gates, such as for example inverters. The clock distribution delay from input pin though output pin of the equal delay path is designed to be equal to the clock distribution delay from input pin though the clock distribution tree on the chip. For each chip to be synchronized, the clock signal is routed through an equal delay path on each of the other chips to be synchronized before being coupled to the clock distribution tree input terminal of the destination chip. Process variations that affect the clock distribution tree delay of the logic on the chip are likely to have a similar effect on the clock distribution delay of the equal delay path(s) on this chip. This minimizes the effect of process variations on the clock alignment in the system. The clock alignment in the present invention thereby essentially depends only upon the reasonable uniformity of process parameters over the area of a single chip. By contrast, in conventional calibrated multiple chip systems the clock distribution delay depends on process and design variations between each of the chips to be synchronized.

The number of equal delay paths that is included on each chip is a function of the number of chips to be synchronized. "N" equal delay paths are used where the number of chips is greater than $2^{N-1}$ and is less than or equal to $2^N$. For example, in a system with eight synchronized chips three equal delay paths are used. The equal delay paths are designed to match the clock distribution tree delay of the chip they are on. Each equal delay path has its own input pin and output pin, which pins used at each level of interconnect is shown at the left of FIGS. 2A, 3 and 4, and the last level is the connection to the clock distribution tree input. To ensure uniform loading in systems with greater than two synchronized chips, one of the equal delay paths has two outputs, so that in a properly structured interconnect of equal delay paths there is a single load for each output pin. Each of the outputs has its own output driver so that each output provides equal clock signals.

DETAILED DESCRIPTION OF THE PREFERRED EMBODIMENTS

The present invention provides a multiple, more than two, chip self-aligning clock distribution system. The clock signal provided to any given chip is delayed by the on-chip clock distribution tree time of every other chip with which it is to be synchronized. Delay paths are added to each chip which provide a delay equal to the clock distribution tree delay of the chip. The delay paths can comprise a series of logic gates, such as for example inverters. The clock distribution delay of the equal delay path is designed to be equal to the clock distribution tree on the chip. Process variations that affect the clock distribution tree delay of the logic on the chip are likely to have a similar effect on the clock distribution delay of the equal delay path. This minimizes the effect of process variations on the clock alignment in the system. The clock alignment in the present invention thereby essentially depends only upon the reasonable uniformity of process parameters over the area of a single chip. By contrast, in conventional calibrated multiple chip systems the clock distribution delay adjustment depends on matching clock distribution delay between each of the chips to be synchronized.

Figure 1A:
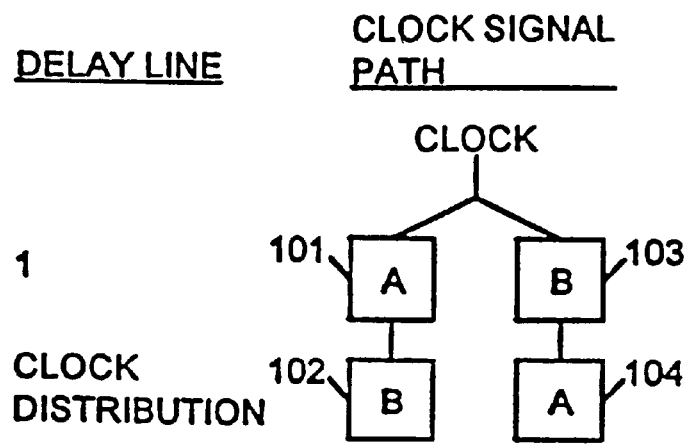
FIG. 1A illustrates a chart of the clock signal path including the equal delay paths in a two chip system according to one embodiment of the present invention.

A chart of the clock signal path including the equal delay paths in a two chip system according to one embodiment of the present invention is illustrated in FIG. 1A. The clock signal is routed through an equal delay path in chip A at stage 101 to the clock distribution tree input of chip B at stage 102. Similarly, the clock signal is routed through an equal delay path in chip B at stage 103 to the clock distribution tree input of chip A at stage 104. The "Delay Path" column indicates which clock signal terminal or equal delay path the clock signal is coupled to on the chip identified in the "Clock Signal Path" column at that stage of the clock distribution path. The "Clock Distribution" label indicates that the clock signal is applied to the clock distribution tree input of the chips at that stage in the clock signal path. The clock distribution tree input is coupled through the clock tree to the device logic gates. A "1" in the "Delay Path" column indicates that the clock signal is routed through equal delay path 1. In a two chip system only one equal delay path is used in each chip to be synchronized as illustrated in FIG. 1B.

Figure 1B:
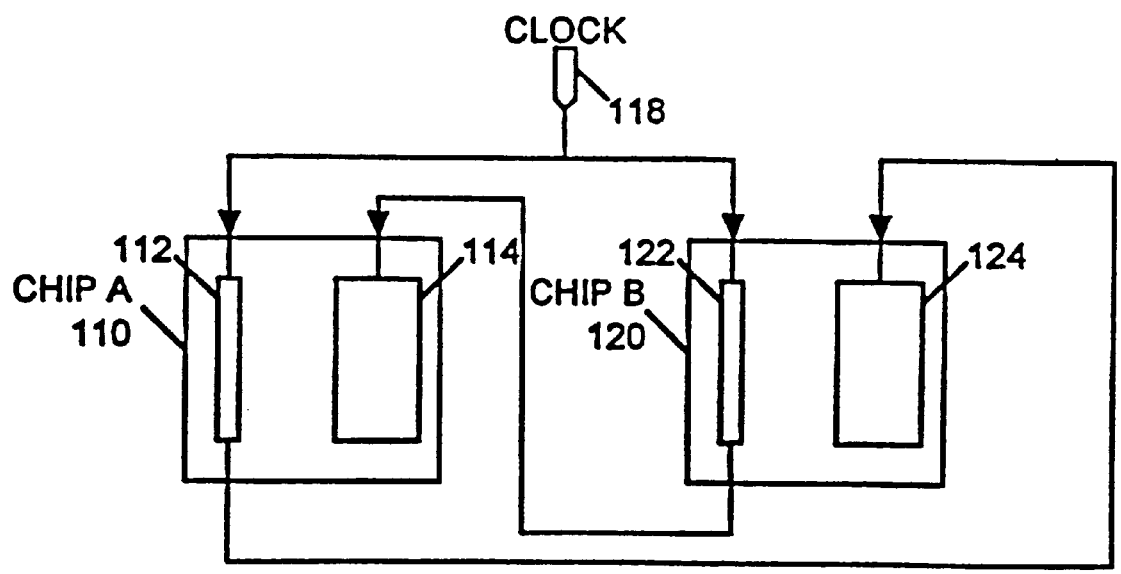
FIG. 1B illustrates a block diagram of a system with two synchronized chips according to one embodiment of the present invention.

FIG. 1B illustrates a block diagram of a two chip system with a self-aligning clock distribution system according to one embodiment of the present invention. The clock signal is routed through equal delay path (EDP) 112 in chip A 110 to the clock distribution tree input of chip B 120 and on through the chip B clock distribution tree (CDT) 124, where the clock signal is supplied to the logic circuits. Similarly the chip A clock signal is routed through the chip B 120 equal delay path (EDP) 122 to the clock distribution tree input of chip A 110 and on through the chip A clock distribution tree (CDT) 114, where the clock signal is supplied to the logic circuit.

The number of equal delay paths that is included on each chip is a function of the number of chips to be synchronized. "N" equal delay paths are used where the number of chips is greater than $2^{N-1}$ and is less than or equal to $2^N$. For example, in a system with eight synchronized chips three equal delay paths are used. The equal delay paths, from input through output, are designed to match the clock distribution tree delay of the chip they are on. Each equal delay path has its own input pin and output pin. To ensure uniform loading in systems with greater than two synchronized chips, one of the equal delay paths has two outputs, so that in a properly structured interconnect of equal delay paths there is a single load for each output pin. Each of the outputs has its own output driver so that each output provides equal clock signals.

Figure 5:
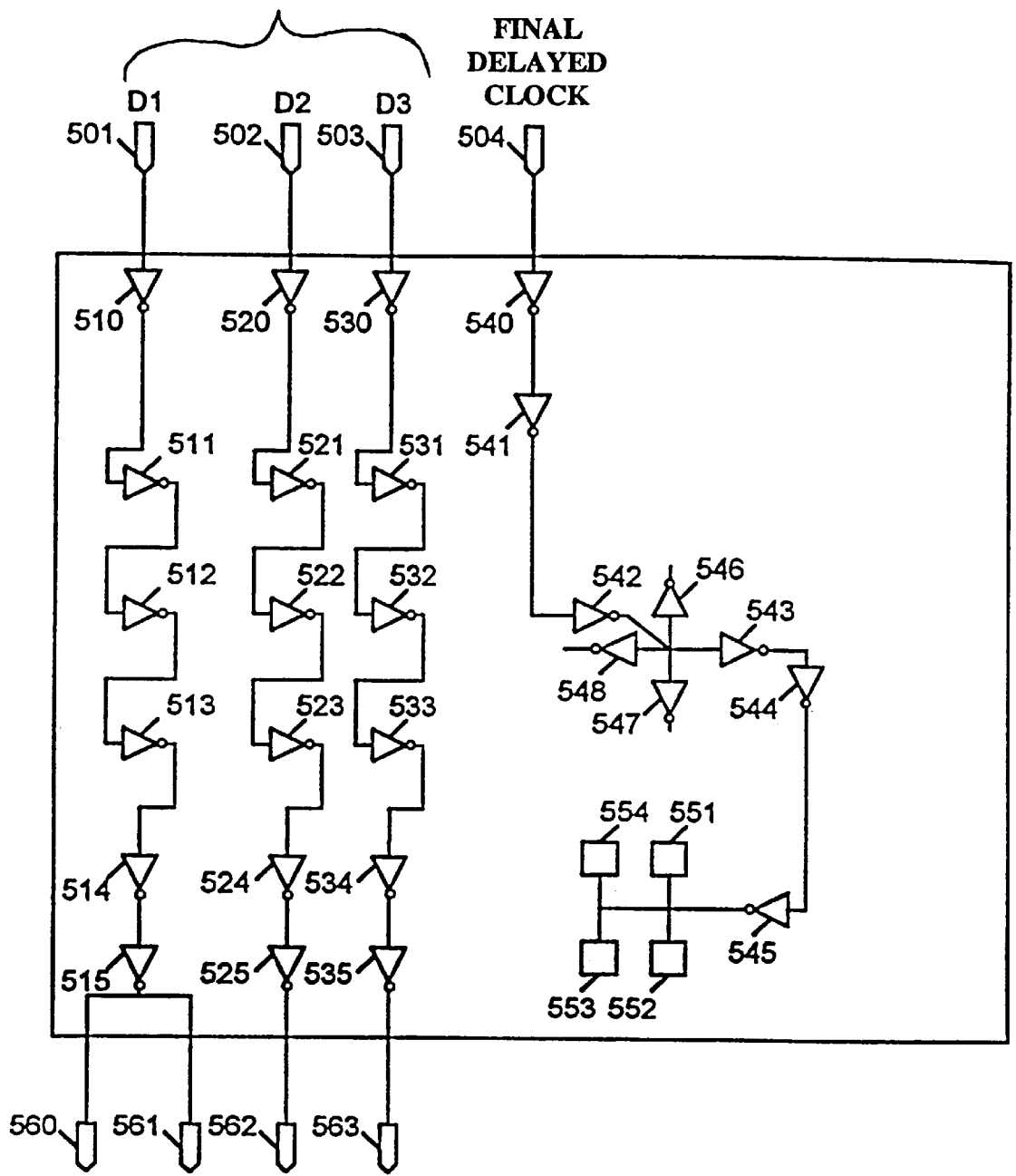
FIG. 5 illustrates a circuit diagram of a chip that includes three equal clock delay paths according to one embodiment of the present invention.

A chip that includes three equal clock delay paths is illustrated in FIG. 5. The equal delay paths are labeled D1 501, D2 502 and D3 503. Each equal delay path is comprised of an even number of inverters. The number of inverters and the length of the metal interconnect traces coupling the inverters in the equal delay paths are defined so as to match the clock distribution delay of the clock distribution tree. In the embodiment of FIG. 5, the equal delay paths and the clock distribution tree each comprise six inverters. The total length of the interconnects between the inverters in each equal delay path and the clock distribution tree are designed to be equal so that the time to charge up the line for each of the paths is the same. For example, equal delay path D1 501 is comprised of inverters 510–515. Equal delay clock path D1 501 also has two output pins. Each of these outputs has an output driver not shown on the diagram.

The clock distribution tree is comprised in part of inverters 540–548. At the end of the clock distribution tree the clock signal is provided to flip-flops 551–554. FIG. 5 illustrates a simplified version of one component of a clock distribution tree. The branches of the clock distribution tree from inverters 546–548 are not shown. As is known by those of ordinary skill in the art, clock distribution trees are defined so as to provide the clock signal to all the flip-flops or latches that it is coupled to at the same time. Some chips use more than one clock and have a separate clock distribution tree for each clock that is used.

Since process variations over the area of a single chip are very small, the clock distribution delay in the equal delay paths tightly tracks the delay in the clock distribution tree. By contrast, process variations between different devices on a wafer can be substantially larger, process variations between devices from separate wafers can be even larger, and design variations may be very different.

Figure 2A:
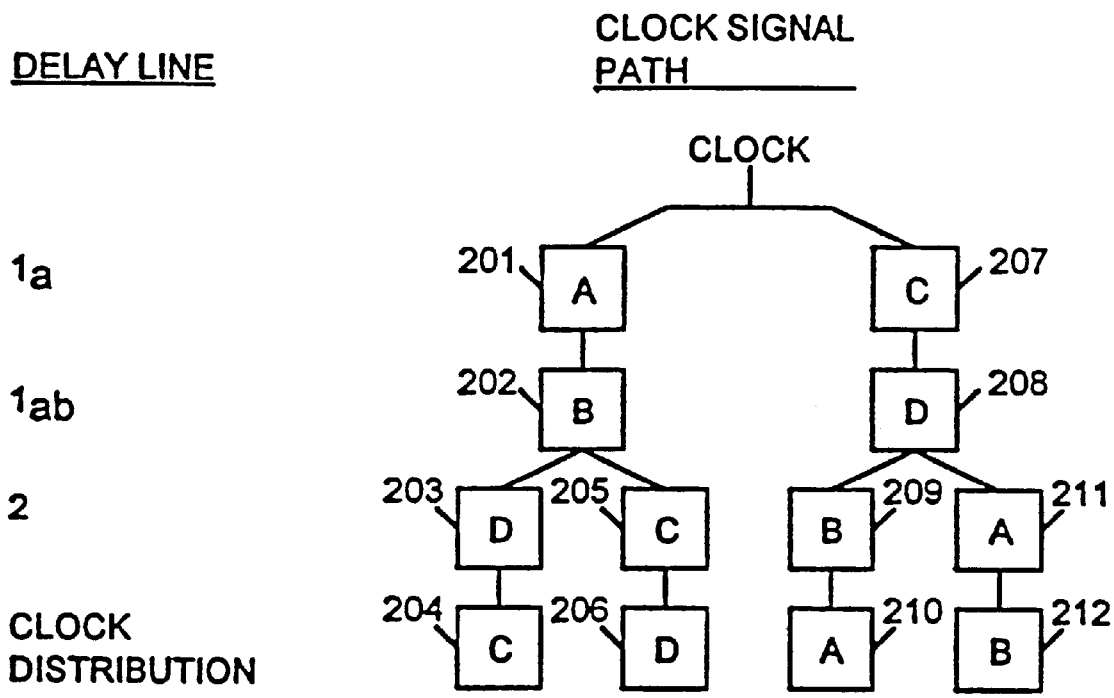
FIG. 2A illustrates a chart of the clock signal path including the equal delay paths in a four chip system according to one embodiment of the present invention.

A chart of the clock signal path including the equal delay paths in a four chip system according to one embodiment of the present invention is illustrated in FIG. 2A. In this embodiment equal delay path 1 has two outputs designated "a" and "b." In one branch of the clock distribution network, the system clock signal is routed from the system clock input terminal through chip A at stage 201 to the equal delay path 1a output at stage 201. The clock signal is then coupled to equal delay path 1 in chip B at stage 202. From chip B at stage 202 the clock signal is routed to the second equal delay paths of chip D at stage 203 and chip C at stage 205. From chip D at stage 203 the clock signal is routed to the clock distribution tree input terminal of chip C at stage 204. From chip C at stage 205 the clock signal is routed to the clock distribution tree input terminal of chip D at stage 206.

In a second branch of the clock distribution network the system clock signal is routed from the system clock input terminal to chip C at stage 207, and from the chip C equal path delay 1a output to equal delay path 1 in chip D at stage 208. From chip D at stage 208 the clock signal is routed to the second equal delay paths of both chip B at stage 209 and chip A at stage 211. From chip B at stage 209 the clock signal is routed to the clock distribution tree input terminal of chip A at stage 210. From chip A at stage 211 the clock signal is routed to the clock distribution tree input terminal of chip B at stage 212. Thus for each chip, the clock signal is routed through an equal delay path in each of the other synchronized chips before being coupled to the clock distribution tree input terminal of a chip. This approach thereby incorporates process and design variations between chips into the alignment process. If a new chip is substituted for an existing chip, and the new chip has a different clock distribution tree time, that difference in the clock distribution tree time should be reflected in the equal delay paths of the chip. Therefore this difference in the clock distribution tree delay is added to the clock distribution delay of each of the other synchronized chips in the system, and the clock signals at the ends of the clock distribution trees of each of the synchronized chips remain simultaneous, that is aligned.

Figure 2B:
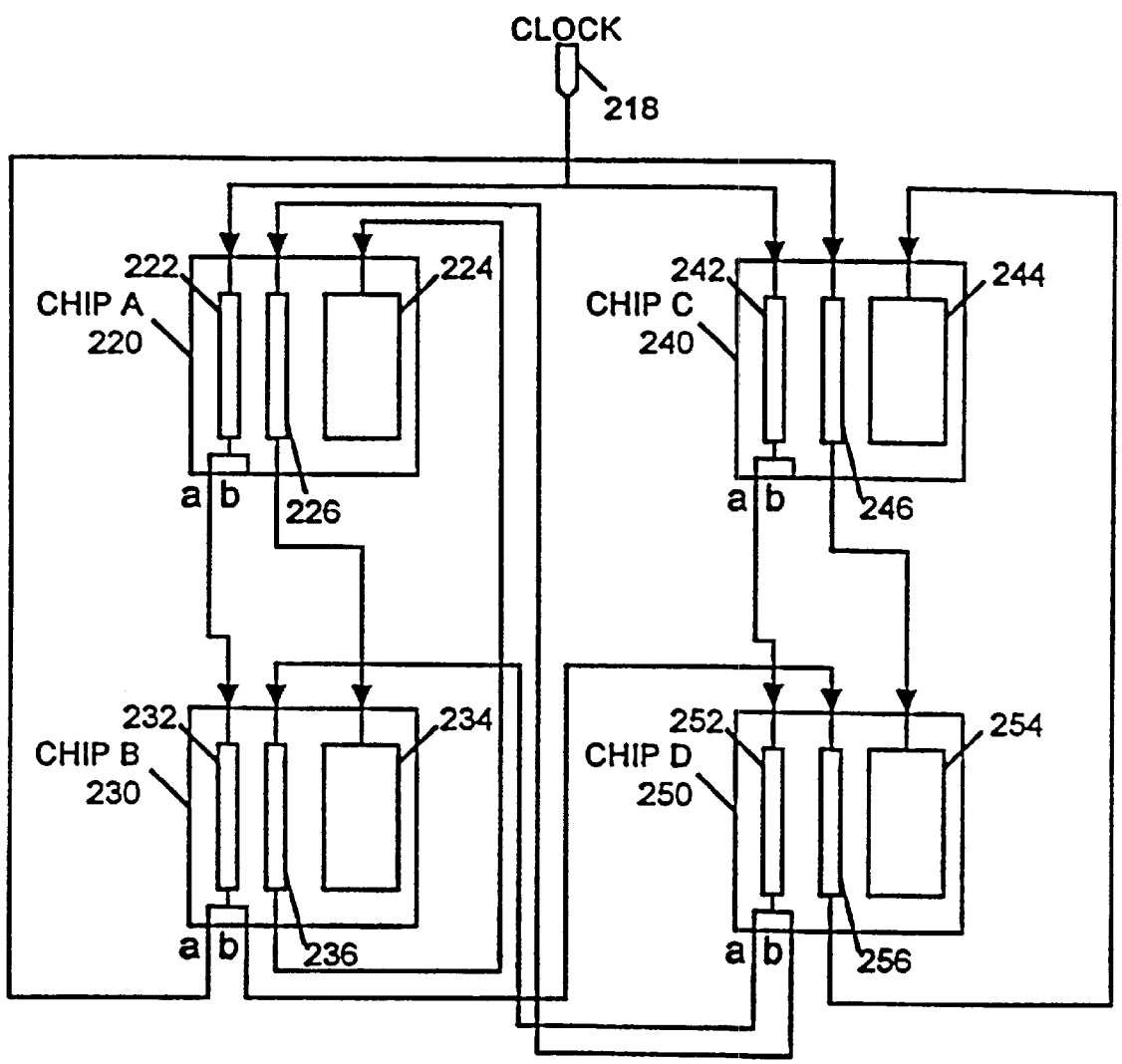
FIG. 2B illustrates a block diagram of a system with four synchronized chips according to one embodiment of the present invention.

A block diagram of a system with four synchronized chips is illustrated in FIG. 2B. The synchronized chips should be interconnected in a binary interconnect schema with transmission lines of uniform impedance, delay per unit length and of equal length. In one embodiment, a printed circuit line close to a ground plane is used as the interconnect. The effective transmission line lengths and therefor delays from the system clock or clock distribution delay path output terminals to the chip clock distribution delay path or tree input terminals on each chip should be equal. The interconnects shown in FIG. 2B are symbolic interconnects and are not intended to represent the actual relative lengths of the different interconnects. The four chips in the system are chip A 220, chip B 230, chip C 240 and chip D 250. Each chip is comprised of a first equal delay path (EDP1), for example path 222 in chip A 220, a second equal delay path, for example path 226, and a clock distribution tree (CDT) serving a logic circuit block, for example block 224. The clock signal is provided from system clock input terminal 218 to the first equal delay path input terminals of chip A 220 and chip C 240. The routing of the clock signal from chip A 220 through to the clock distribution input terminal of chip C 240 is as follows: from the first equal delay path 222 "a" output of chip A 220 to the first equal delay path 232 input of chip B 230, from the first equal delay path 232 "b" output to the second equal delay path 256 input of chip D 250, and from second equal delay path 256 output to the clock distribution tree input terminal of chip C 240 and through to logic block 244. The other three clock network distribution paths are as defined in FIG. 2A. The clock signal for each chip is routed through equal delay paths in the other three chips.

Figure 3:
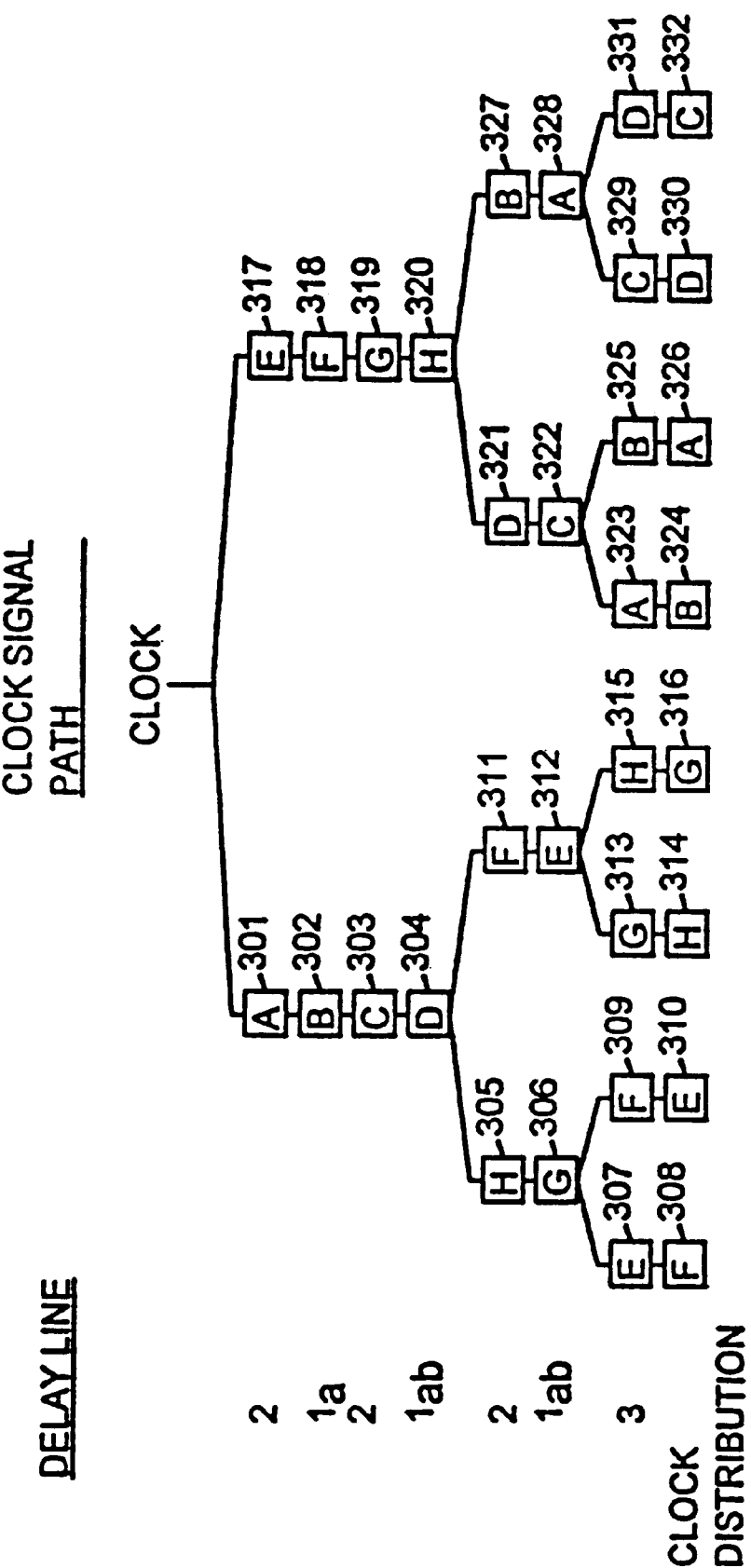
FIG. 3 illustrates a chart of the clock signal path including the equal delay paths in an eight chip system according to one embodiment of the present invention.

A chart of the clock signal path including the equal delay paths in an eight chip system according to one embodiment of the present invention is illustrated in FIG. 3. Each chip in the system of FIG. 3 includes three equal delay paths, and the first equal delay path of each chip has two outputs, 1a and 1b, as illustrated in FIG. 5. The clock signal is coupled to the second equal delay path of chip A at stage 301. From stage 301 the clock signal is routed through the delay paths shown in the left most column in chips B, C, and D in stages 302–304. From chip D at stage 304 the clock signal is routed from the 1a and 1b outputs to the designated delay paths of chip H at stage 305 and of chip F at stage 311. After chip H at stage 305 the clock signal is routed to the designated delay path of chip G at stage 306, and then the clock signal outputs 1"a" and 1"b" are coupled to the designated delay paths of chip E at stage 307 and of chip F at stage 309. From stage 307 the clock signal is routed to the clock distribution tree input of chip F at stage 308. FIG. 3 illustrates the clock distribution paths for each of the other seven chips in the system. For each chip, the clock signal is routed in a binary interconnect schema through equal delay paths on all the other chips before being coupled to the clock distribution tree input terminal of the destination chip. In this manner, the clock signal is self aligned, that is arriving at the end of the clock distribution trees simultaneously, based upon the clock distribution delay of each synchronized chip in the system.

Figure 4:
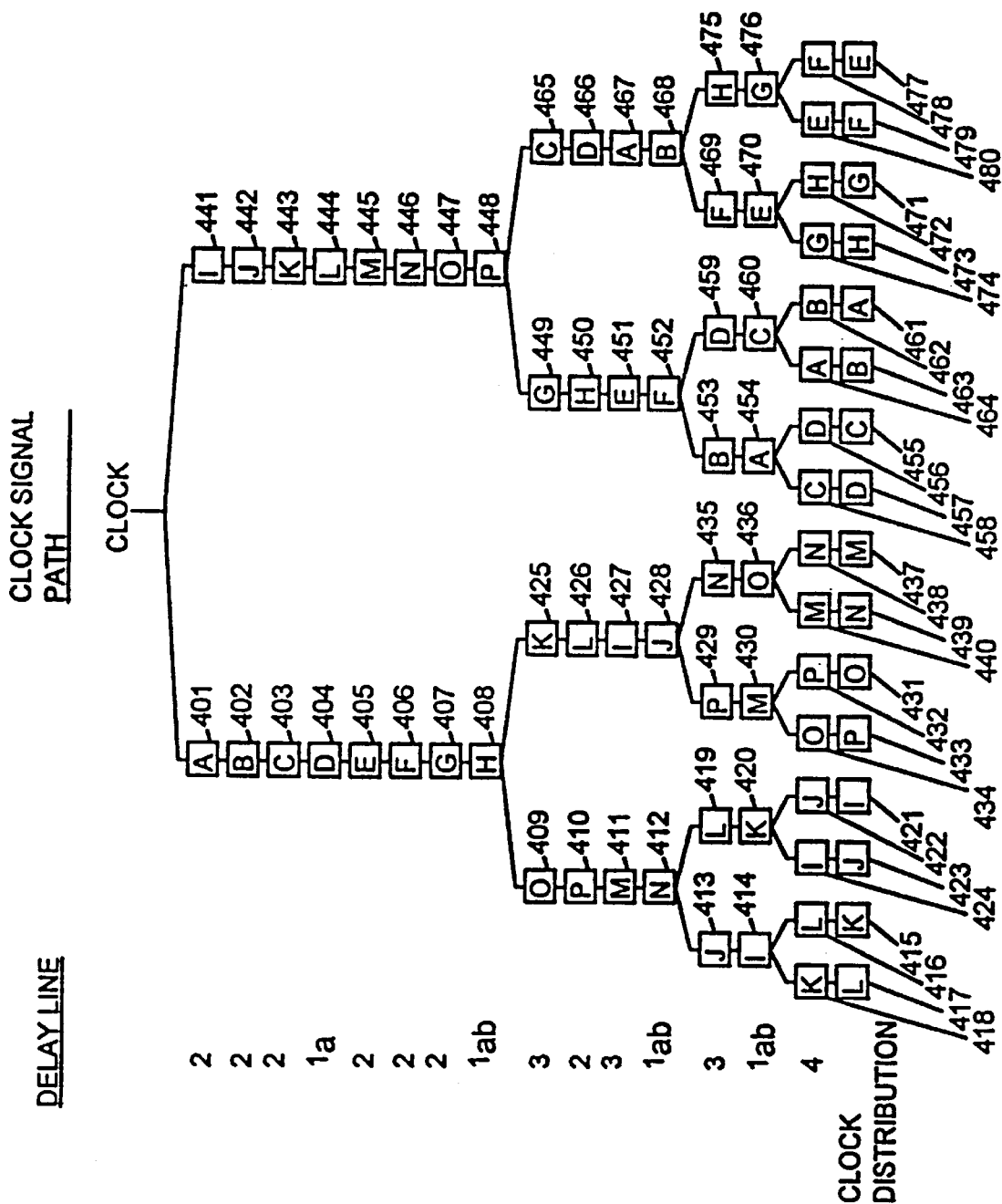
FIG. 4 illustrates a chart of the clock signal path including the equal delay paths in a sixteen chip system according to one embodiment of the present invention.

A chart of the clock signal path including the equal delay paths in a sixteen chip system according to one embodiment of the present invention is illustrated in FIG. 4. Each chip in the system in FIG. 4 includes four equal delay paths, and the first equal delay path of each chip has two outputs, 1a and 1b. The clock is coupled to the second equal delay path of chip A at stage 401. From stage 401 the clock signal is routed through the designated equal delay paths on chips B–H at stages 402–408. From chip H at stage 408 the clock signal outputs 1"a" and 1"b" are coupled to the designated delay paths of chip O at stage 409 and of chip K at stage 425. From chip O at stage 409 the clock signal is routed to the designated delay paths of chips P, M and N at stages 410–412. From chip N at stage 412 the clock signal outputs 1"a" and 1 "b" are coupled to chip J at stage 413 and to chip L at stage 419. From stage 413 the clock signal is coupled to the designated delay path of chip I at stage 414. From chip I at stage 414 the clock signal outputs 1"a" and 1 "b" are coupled to chip K at stage 418 and to chip L at stage 416. Following chip K at stage 418 the clock signal is coupled to the clock distribution tree input of chip L at stage 417. FIG. 4 illustrates the clock distribution paths for each of the other fifteen chips in the system. For each chip, the clock signal is routed through equal delay paths on all the other chips before being coupled to the clock distribution input terminal of the destination chip. In this manner, the clock signal is self aligned, that is arriving at the end of the clock distribution trees simultaneously, based upon the clock distribution delay of each synchronized chip in the system.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For example, the chips can be coupled using different patterns and different equal delay paths than those illustrated in the drawings. This invention can also be used to synchronize a clock signal provided to a plurality of discrete integrated circuit die mounted in a multi-chip module, or other such sub-components of a system.

Thus a system and method for multiple chip self-aligning clock distribution has been described.

What is claimed is:

1. A multiple chip self-aligning clock distribution system comprising:

a system clock signal output terminal;

a plurality of chips comprising greater than $2^{N-1}$ chips and not more than $2^N$ chips, where N is greater than 1, wherein each of said chips comprises N clock distribution delay path input terminals, N+1 clock distribution delay path output terminals, N equal clock delay paths having delay equal to the clock distribution tree, said clock delay paths coupled to said corresponding clock distribution delay path input and output terminals, a clock distribution tree input terminal, a clock distribution tree having branches, and logic circuitry, said clock distribution tree coupled to said clock distribution tree input terminal, said logic circuitry coupled to ends of said clock distribution tree branches;

said system clock signal output terminal coupled to one of said clock distribution delay path input terminals, the output terminal of which becomes a delayed system clock input to a succeeding chip, wherein said clock distribution tree input terminal in each of said plurality of chips is coupled to said system clock input signal after passing through one of said N equal clock delay paths of each of the other of said plurality of chips, so that a clock signal simultaneously arriving at said ends of said clock distribution tree branches of each of said plurality of chips regardless of process and design variations between them, wherein the clock delay of said N equal clock delay paths on each of said plurality of chips is almost exactly equal to the clock delay of said clock distribution tree on the chip containing the equal clock delay path.

2. The multiple chip self-aligning clock distribution system of claim 2 wherein said N equal clock delay paths comprise metal traces having a length approximately equal to the length of a branch of said clock distribution tree on the chip containing the equal clock delay path.

3. The multiple chip self-aligning clock distribution system of claim 3 wherein said clock distribution tree further comprises a plurality of inverters; and wherein each of said N equal clock delay paths further comprises a plurality of inverters equal to the number of inverters in said clock distribution tree delay path on the chip containing the equal clock delay path.

4. A multiple chip self-aligning clock distribution system comprising:

a system clock signal output terminal;

a plurality of chips comprising greater than $2^{N-1}$ chips and not more than $2^N$ chips, where N is greater than 1, wherein each of said chips comprises N clock distribution delay path input terminals, N+1 clock distribution delay path output terminals, N equal clock delay paths having delay equal to the clock distribution tree, said clock delay paths coupled to said corresponding clock distribution delay path input and output terminals, a clock distribution tree input terminal, a clock distribution tree having branches, and logic circuitry, said clock distribution tree coupled to said clock distribution tree input terminal, said logic circuitry coupled to ends of said clock distribution tree branches;

said system clock signal output terminal coupled to one of said clock distribution delay path input terminals, the output terminal of which becomes a delayed system clock input to a succeeding chip, wherein said clock distribution tree input terminal in each of said plurality of chips is coupled to said system clock input signal after passing through one of said N equal clock delay paths of each of the other of said plurality of chips, so that a clock signal simultaneously arriving at said ends of said clock distribution tree branches of each of said plurality of chips regardless of process and design variations between them, wherein one of said N equal clock delay paths on each of said plurality of chips has two output terminals.

5. The multiple chip self-aligning clock distribution system of claim 4 wherein lengths of the interconnect path from said system or delayed system clock output terminal to said clock distribution input terminal in each of said plurality of chips is equal, and which are connected in the binary interconnection schema shown in the figures.

* * * * *